United States Patent [19]
Fujiie et al.

[11] Patent Number: 5,528,569
[45] Date of Patent: Jun. 18, 1996

[54] RECORDING MEDIUM AND A METHOD AND APPARATUS FOR RECORDING AND REPRODUCING DIGITAL DATA IN DATA CLUSTERS AND CLUSTER LINKING SECTORS ON THE RECORDING MEDIUM

[75] Inventors: Kazuhiko Fujiie; Yasuaki Maeda, both of Tokyo, Japan

[73] Assignee: Sony Corporation, Tokyo, Japan

[21] Appl. No.: 856,662

[22] Filed: Mar. 24, 1992

[30] Foreign Application Priority Data

Mar. 28, 1991 [JP] Japan ..................................... 3-087376

[51] Int. Cl.$^6$ ..................................................... G11B 5/09
[52] U.S. Cl. ........................................... 369/48; 369/275.3
[58] Field of Search .................................. 369/54, 58, 59, 369/47, 48, 49, 124, 13, 275.3

[56] References Cited

U.S. PATENT DOCUMENTS 4,733,385  3/1988  Henmi et al. ............................. 369/13
5,099,464  3/1992  Maeda ....................................... 369/59
5,130,816  7/1992  Yoshio ...................................... 369/49

FOREIGN PATENT DOCUMENTS

0390601A2  10/1990  European Pat. Off. ........ G11B 7/007
0419239A2  3/1991   European Pat. Off. ........ G11B 7/007
0472414A1  2/1992   European Pat. Off. ........ G11B 7/007

*Primary Examiner*—Georgia Y. Epps
*Assistant Examiner*—P. W. Huber
*Attorney, Agent, or Firm*—Limbach & Limbach; Philip M. Shaw, Jr.

[57] ABSTRACT

A disc shaped recording medium, and an apparatus for recording and reproducing data thereon, in which data to be recorded thereon are divided into sectors at an interval of a predetermined length and arrayed into clusters at an interval of a predetermined number of the sectors, and in which cluster-linking sectors are added at connecting portions of the neighboring clusters, and in which cluster addresses for specifying the clusters and sector addresses for specifying the sectors in the cluster are prerecorded on the recording medium.

13 Claims, 7 Drawing Sheets

RECORDING MEDIUM AND A METHOD AND APPARATUS FOR RECORDING AND REPRODUCING DIGITAL DATA IN DATA CLUSTERS AND CLUSTER LINKING SECTORS ON THE RECORDING MEDIUM

BACKGROUND OF THE INVENTION

1. Field of the Invention

This invention relates to a disc-shaped recording medium, a disc recording apparatus and a disc reproducing apparatus. Note particularly, it relates to a disc-shaped recording medium, a disc recording apparatus and a disc reproducing apparatus adapted for recording and reproducing data by e.g. optical means.

2. Description of the Related Art

An optical disc may have a recording capacity larger by two or three orders than that of a magnetic disc, while enabling accessing at a higher speed than that for a tape recording medium. An optical disc also has the advantage of contactless data recording and reproduction, so has good durability and has come to be used extensively. A well known form of optical disc is the so-called compact disc (CD).

To provide a portable and, above all a pocketable headphone stereo or similar recording/reproducing apparatus using an optical disc, a CD with a diameter of 12 cm and a CD diameter of 8 cm have been proposed. However, with a disc diameter of 12 cm, the recording/reproducing apparatus is too bulky to be readily portable. Therefore, a disc 8 mm or less in diameter would be preferred. However, in attempting to construct a portable or pocket size recording and/or reproducing apparatus for an optical disc 8 cm or less in diameter, the following problems arise.

In the case of a standard CD format optical disc, on which are recorded stereophonic digital PCM audio signals sampled with a sampling frequency of 44.1 kHz and quantized with 16 bits, and where these signals are exclusively reproduced by the user (CD-DA format), the playback time (recording time) of a disc 8 cm in diameter is 20 to 22 minutes at most, meaning that a symphony, for example, cannot be recorded on one disc side. A playback time of 74 minutes or longer, which is approximately equal to that of a 12 cm CD, is preferred. Besides, with this CD-DA format), recording by the user cannot, be made. In addition, a contact, less type optical disc device is weak to mechanical vibrations and subject to detracking and defocusing. Thus, when the apparatus is to be portable, some positive measures need to be taken to prevent adverse effects of the detracking or defocusing on the reproducing operation.

On the other hand, with a CD-MO format (a format, employing recordable magneto-optical disc) as an extension format of the above mentioned standard CD format (CD-DA format), the recording/reproducing time of an 8 cm disc is only 20 to 22 minutes, as in the CD-DA format. The optical pickup device is similarly susceptible to detracking or defocusing due to mechanical vibrations, such that again positive measures need to be taken to prevent any adverse effects thereof on the recording/reproducing operation.

In the so-called CD-I (CD-Interactive) format or in the so-called CD-RON/XA format, the levels shown in Table 1 are prescribed as the modes for recording/reproducing bit-compressed digital audio signals:

TABLE 1

| LEVEL | SAMPL- ING FRE- QUENCY | QUANTIZ- ED NUMBER OF BITS | BAND- WIDTH | PLAYBACK TIME STEREO/ MONAURAL |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

Referring to Table 1, when reproducing a disc recorded with, for example, the level B mode, signals obtained by 4-fold bit compression of standard CD-DA format digital signals are reproduced. Thus, if all of the recorded data are stereophonic audio compressed data, playback time may be increased 4-fold, or reproduction of 4-channel data becomes possible, so that reproduction for 70 minutes or longer may be made with an optical disc 8 cm in diameter or less.

Meanwhile, with the CD-I format, the disc is rotationally driven at the same linear velocity as that with the standard CD-DA format, so that continuous audio compressed data are reproduced at a rate of one unit to n playback units on the disc, where n is a figure corresponding to the bit compression factor or the above-mentioned playback time and is equal to four in the level B stereo mode. This unit is termed a block or sector, which is made up of 98 frames and has a period of $\frac{1}{75}$ second. Therefore, with this level B stereo mode, a data string in which one of four sectors is an audio sector, such as:

SDDDSDDD . . .

where S is an audio sector and D is another audio sector or sectors, is recorded on a sector-by-sector basis on the disc. However, for actual recording, since the above data string undergoes a predetermined encoding similar to that for ordinary CD format audio data, such as error correction coding and interleaving, data of the audio sector S and data of the data sector D are arranged in a scrambled fashion in the recording sectors on the disc. The other data sectors D may, for example, be video or computer data. When the bit-compressed audio signals are also used for the data sector D, a data string in which 4-channel audio sectors S1 to S4 are cyclically arranged; that is a data string:

S1 S2 S3 S4 S1 S2 S3 S4 . . .

encoded and recorded on the disc. When recording and reproducing continuous audio signals, the above-mentioned 4-channel audio signals are linked sequentially beginning at the first channel and terminating at the fourth channel. More specifically, channel 1 data corresponding to the audio sector S1 are reproduced from the innermost to the outermost areas of the disc. Channel 2 data corresponding to the audio sector S2 are reproduced from the innermost to the outermost areas of the disc. Channel 3 data corresponding to the audio sector S3 are reproduced from the innermost to the outermost areas of the disc. Finally, channel 4 data corresponding to the audio sector S4 are reproduced from the innermost to the outermost areas of the disc to enable data reproduction for a continuous 4-fold time duration.

However, for the above mentioned continuous reproduction, several track jump operations spanning the inner and outer disc peripheries are necessitated. Since a track jump cannot be achieved instantaneously, playback data are interrupted for a short time period. This means that the playback sound is momentarily interrupted. On the other hand, when continuous audio signals are to be recorded, it is not possible to record only the sector 2 signals, as an example, because the data need to be interleaved at the time of recording. That is, sector 2 data need to be interleaved with adjoining and even near-by sectors, such as sectors S1 and S3, such that it becomes necessary to rewrite signals of previously recorded sectors. Thus it is extremely difficult to effect realtime recording of these continuous compressed audio signals.

Moreover, it is desirable to permit switching selection between the above-mentioned compression modes, because then the usage of the recording/reproducing apparatus can be significantly increased. However, if it is necessary to change the rotational velocity of the disc, the recording pattern, or the signal processing operation, for each of the selected compression modes, the circuitry becomes complex, while it is difficult to make an inexpensive apparatus. It is therefore desirable that changes brought about in the control operations, recording patterns or signal processing operations as a result of the different compression modes be as small as possible.

For overcoming the above-mentioned problems, the present Assignee has proposed the following technique in our copending U.S. Pat. No. 5,243,588, issued Sep. 7, 1993.

Specifically, this technique resides in arranging digital data into a plurality of clusters at an interval of a predetermined number of, for example, 32, sectors, providing e.g. five cluster-linking sectors at the linking portions of each of the clusters, each of the cluster-linking sectors being longer than an interleaving length for digital data so that data interleaving in one cluster does not affect the adjoining clusters.

Figure 1:
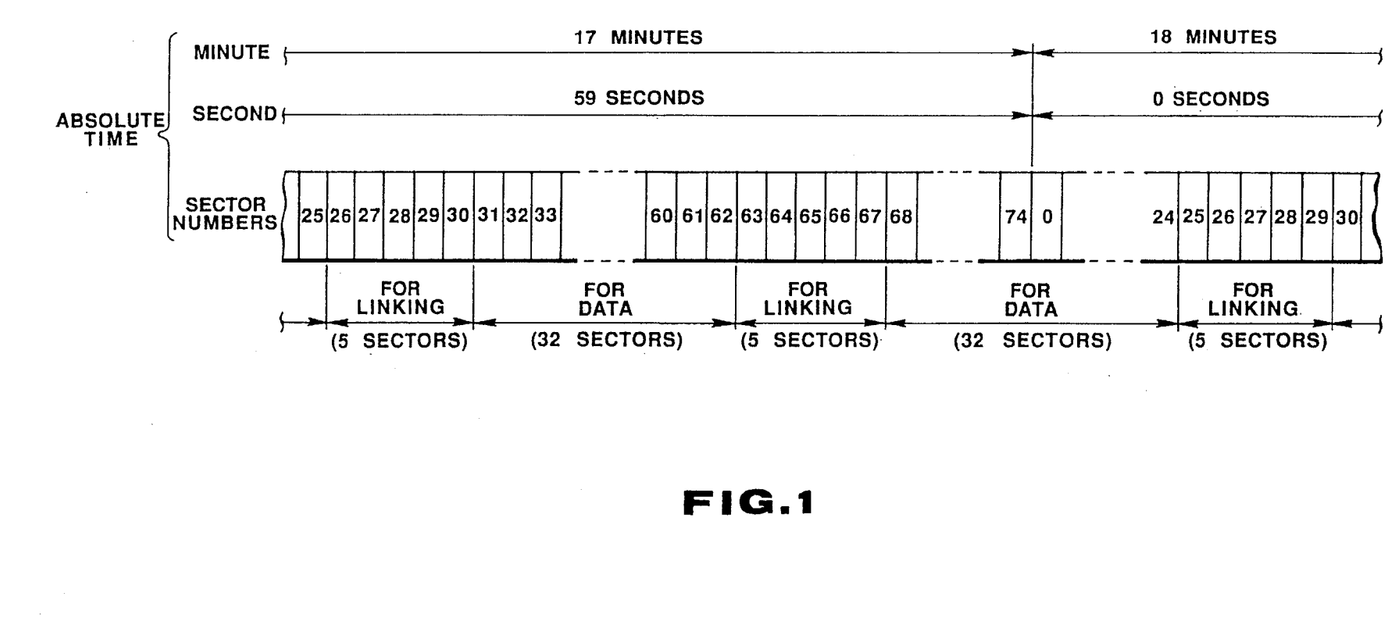
FIG. 1 is a chart showing the relation between the cluster and the absolute time.

Meanwhile, as addresses supervising data on a disc, that is addresses indicating data positions on the disc, the absolute time, such as minutes, seconds and sector numbers shown in FIG. 1, recorded in a subcode Q in the CD-DA format, in a header data in the CD-ROM format and by modulating the guide groove in the CD-MO format, is employed. Such absolute time is also employed for indicating the actual play time.

However, if the digital audio signals are recorded with bit compression, and the compression factor is other than a simple integer, such as two or four, the actual play time can be calculated only by a time-consuming operation. Besides, since the linking sector does not contribute to the actual play time, it is necessary to subtract the linking sectors in calculating the actual play time, so that more time is consumed in calculating the actual play time. Besides, in recording data, it is necessary to begin with the linking sector and calculate to which absolute time this linking sector corresponds.

SUMMARY OF THE INVENTION

It is an object of the present invention to provide a disc-shaped recording medium, a disc recording apparatus and a disc reproducing apparatus wherein, when recording audio data on a disc, complication of processing by interleaving may be avoided and changes in the control operations or signal processing operations may be minimized even when selection is made from plural compression modes.

It is another object of the present invention to provide a disc-shaped recording medium, a disc recording apparatus and a disc reproducing apparatus wherein the recording start position can be determined easily and the play time can also be calculated easily.

In view of the above objects, the present invention provides a disc-shaped recording medium in which data to be recorded thereon are divided into sectors at an interval of a predetermined length and arrayed into clusters at an interval of a predetermined number of the sectors, and in which cluster-linking sectors each having a length longer than an interleaving length are added at connecting portions of the neighboring clusters, wherein cluster addresses for specifying the clusters and sector addresses for specifying the sectors are prerecorded on the recording medium.

The present invention also provides a disc recording apparatus comprising a disc-shaped recording medium on which cluster addresses for specifying the clusters and sector addresses for specifying the sectors in the clusters are prerecorded, address reproducing means for reproducing the cluster addresses and the sector addresses from the disc-shaped recording medium, storage means for transiently storing digital data, recording means for arraying the digital data from the memory means into clusters at an interval of a predetermined number of sectors, interleaving the digital data and recording the interleaved data on the disc-shaped recording medium, and controlling means for controlling accessing of the recording means based on the cluster addresses and the sector addresses from the address reproducing means.

The present invention also provides a disc reproducing apparatus comprising address reproducing means for reproducing cluster addresses for specifying clusters and sector addresses for specifying sectors in the clusters, prerecorded on a disc-shaped recording medium, in which digital data are interleaved and recorded in said clusters at an interval of a predetermined number of the sectors and in which cluster-linking sectors each having a length longer than an interleaving length are provided at linking portions between the neighboring clusters, data reproducing means for reproducing playback data from said disc-shaped recording medium, storage means for transiently storing the playback data from said data reproducing means, memory controlling means for performing a controlling operation for writing said playback data in said memory means when the volume of the playback data stored in the memory means is less than a predetermined volume for maintaining a readout space in excess of a predetermined data volume in said memory means, and controlling means for controlling accessing of said data reproducing means based on the cluster addresses and the sector addresses from said address reproducing means.

When recording data on the disc-shaped recording medium, data are stored on the cluster-by-cluster basis, based on the prerecorded or preformatted cluster and sector addresses. Since the cluster-linking sectors each longer than the interleaving length are provided between the adjoining clusters, the effect of interleaving on the adjoining clusters may be eliminated by recording the digital data together with the cluster-linking sectors. Besides, the recording start positions on the disc may be known based on these cluster and sector addresses.

On the other hand, with the clusters and the cluster-linking sectors as the recording units, recording may be made independently from one cluster to another without the necessity of taking account of the effect of interleaving on other clusters for facilitating the processing and the re-recording of data which has not been recorded effectively.

For reproduction, by providing storage means for transient storage of the playback data and effecting reproduction based on the preformatted cluster and sector addresses, dropout of the playback data by the cluster-linking sectors may be buffered and continuous playback data may be produced from the memory means while the play time may be calculated easily from the cluster and sector addresses.

DESCRIPTION OF THE PREFERRED EMBODIMENTS

Figure 2:
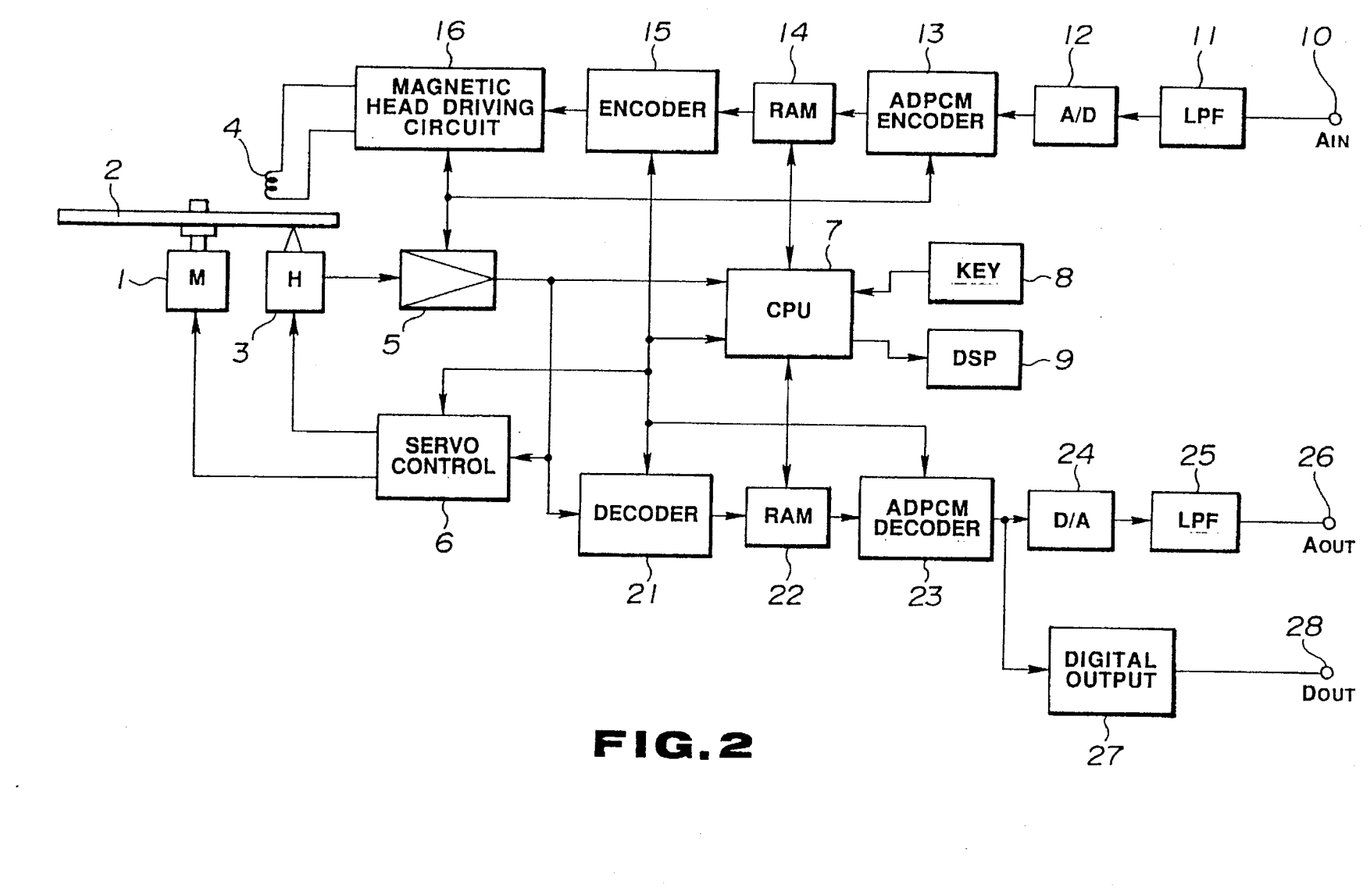
FIG. 2 is a block diagram showing an exemplary arrangement of a disc recording and/or reproducing apparatus according to an embodiment of the present invention.

Referring to the drawings, a preferred embodiment of disc recording/reproducing apparatus according to the present invention will be explained in detail. FIG. 2 is a block circuits diagram showing a circuit arrangement of the optical disc recording/reproducing apparatus of the present invention.

In the optical disc recording/reproducing apparatus, shown in FIG. 2, a magneto-optical disc 2 rotationally driven by a spindle motor 1 is employed as a recording medium. While a laser light is radiated by an optical head 3 on the disc 2, a magnetic field modulated in accordance with recording data is applied by a magnetic head 4 to the disc 2 for recording data along a recording track of the disc 2. On the other hand, the recording track of the disc 2 is traced with a laser light by the optical head 3 for photomagnetically reproducing the recorded data. Data recording/playback is performed on the basis of cluster addresses and sector addresses pre-recorded (preformatted) on the magneto-optical disc 2 as will be explained subsequently.

The optical head 3 comprises a laser light source, optical components, such as a collimator lens, an objective lens, a polarization beam splitter or a cylindrical lens, and a split photodetector, although these devices are not shown, and is arranged to face the magnetic head 4 with the disc 2 in-between. For recording data on the disc 2, the optical head 3 radiates a laser light on a target track on the disc 2 for recording data by thermomagnetic recording. The magnetic field modulated in accordance with the recording data is applied to the target track by the magnetic head 4, which is driven by a head driving circuit 16 of the recording system which will be explained subsequently. The optical head 3 detects a laser light radiated on and reflected by the target track for detecting the focusing error by a so-called astigmatic method, as well as detecting the tracking error by a so-called push-pull method. When reproducing data from the magneto-optical disc 2, the optical head 3 detects the difference of a polarization angle (Kerr rotation angle) of the reflected laser light, from the target track to produce playback signals. The optical head 3 also reproduces the cluster addresses and the sector addresses preformatted by modulating the guide groove at the leading end of each sector.

The output of the optical head 3 is supplied to an RF circuit 5. The RF circuit 5 extracts the focusing error signal and the tracking error signal from the output of the optical head 3 and transmits the extracted signals to a servo control circuit 6 while converting the reproduced signals into corresponding binary signals and supplying the binary signals to a decoder 21 of the reproducing system, which will be explained subsequently. The RF circuit 5 also transmits the cluster addresses and the sector addresses to a system controller 7 as will be explained subsequently.

The servo control circuit 6 comprises a focusing servo controlling circuit, a tracking servo controlling circuit, a spindle motor servo controlling circuit and a thread servo controlling circuit, although these circuits are not shown. The focusing servo controlling circuit focusing controls an optical system of the optical head 3 so that the focusing error signal will be reduced to zero. The tracking servo controlling circuit tracking controls the optical system of the optical head 3 so that the tracking error signal will be zero. The spindle motor servo controlling circuit controls the spindle motor 1 for rotationally driving the magneto-optical disc 2 at a predetermined rotational velocity, such as at a constant linear velocity. The thread servo controlling circuit causes the optical head 3 and the magnetic head 4 to be moved to a target track position on the disc 2 designated by the system controller 7. The servo control circuit 6, which performs these various control operations, transmits an information indicating operating states of components controlled by the servo controlling circuit 6 to the system controller 7.

To the system controller 7 are connected a key input operating section 8 and a display 9. The system controller 7 controls the recording system and the reproducing system with the operating mode designated by the operating input information from the key unit 8. The system controller 7 also supervises the recording position or the reproducing position on the recording track traced by the optical head 3 and the magnetic head 4 on the basis of the cluster addresses and the sector addresses reproduced from the magneto-optical disc 2. The system controller 7 causes a bit compression mode to be displayed on the display section 9 on the basis of bit compression mode data in the reproduced data obtained from the RF circuit 5 by means of a reproducing system as later described, or of bit compression mode data in an adaptive differential PCM (ADPCM) encoder 13 switchingly selected by the key unit 8. The system controller 7 also causes the playback time to be displayed on the display 9 on the basis of the data compression ratio and the above-mentioned cluster addresses in the bit compression mode.

For displaying the playback time, the cluster address reproduced from the recording track of the magneto-optical disc 2 is multiplied by a reciprocal of the data compression ratio in the bit compression mode (4 in the case of ¼ compression) to find an actual time information which is displayed on the display section 9. Meanwhile, it is also possible to display the current position by the actual recording time during recording by multiplying the read-out preformatted cluster address by the reciprocal of the data compression ratio.

The apparatus also comprises an A/D converter 12 to which an analog audio signal $A_{IN}$ is supplied from an input terminal 10 by way of a low-pass filter 11.

The A/D converter 12 quantizes the audio signals $A_{IN}$. The digital audio data obtained at the A/D converter 12 is transmitted to the ADPCM encoder 13. The ADPCM encoder 13 processes digital audio data of the predetermined transfer rate quantized from the audio signals $A_{IN}$ by the A/D converter 12 by a data compressing operation conforming to the various modes in the CD-I system shown in Table 1, and has its operating mode designated by system controller 7. For example, in the B-level mode of Table 1, the digital audio data are processed into compressed data (ADPCM audio data) having a sampling frequency of 37.8 kHz, with the number of bits per sample equal to 4, before being supplied to a memory 14. The data transfer rate with the B-level stereo mode is reduced to ¼ of the standard CD-DA format data transfer rate of 75 sectors/second, or 18.75 sectors/second.

In the embodiment of FIG. 2, it is assumed that the sampling frequency of the A/D converter 12 is fixed at the sampling frequency of the standard CD-DA format, or 44.1 kHz, and that, in the ADPCM encoder 13, bit compression from 16 bits to 4 bits is performed after conversion of the sampling rate in conformity to the compression mode, for example, from 44.1 kHz to 37.8 kHz for level B. Alternatively, the sampling frequency of the A/D converter 12 itself may be switchingly controlled as a function of the compression modes. In this case, the cut-off frequency of the low-pass filter 11 is also switchingly controlled as a function of the switchingly controlled sampling frequencies of the A/D converter 12. That is, the sampling frequency of the A/D converter 12 and the cut-off frequency of the low-pass filter 11 may be simultaneously controlled in dependence upon the compression modes.

The memory 14 is used as a buffer memory in which data writing and read-out are controlled by system controller 7, and which transiently stores ADPCM audio data supplied from the ADPCM encoder 13 for recording on the disc 1 as the occasion may demand. That is, in the B-level stereo mode, the compressed audio data supplied from the ADPCM encoder 13 has its transfer rate reduced to ¼ of the standard CD-DA format data transfer rate of 75 sectors/second, or to 18.75 sectors/second, these compressed data being continuously written in the memory 14. Although it suffices to record the compressed data (ADPCM data) at a rate of every four sectors, it is difficult in practice to make such recording at the rate of every four sectors, as mentioned above. For this reason, sector-continuous recording as later explained is performed. Such recording on the disc is performed in a burst-like manner at the same data transfer rate as that for the standard CD-DA format, or 75 sectors/second, with the interposition of a non-recording period, with a cluster composed of a predetermined number of sectors, for example, 32 data sectors and several linking sectors, as a recording unit. That is, in the memory 14, the B-level stereo mode ADPCM audio data, which has been continuously written at the lower transfer rate of 18.75 (=75/4) sectors/second conforming to the above-mentioned data compression ratio, is read out as recording data in a burst-like manner at the above-mentioned transfer rate of 75 sectors/second on e.g. a the cluster-by-cluster basis. The overall data transfer rate of the data read out and recorded in this way, inclusive of the non-recording period, is a lower transfer rate of 18.75 sectors/second. However, an instantaneous data transfer rate within the time of the burst-like recording operation is equal to the above-mentioned standard rate of 75 sectors/second. Therefore, if the rotational velocity of the disc is the same as that of the standard CD-DA format, that is, a constant linear velocity, recording is made at the same recording density and with the same recording pattern as those of the CD-DA format.

The ADPCM audio data read out from memory 14 in a burst-like manner at the transfer rate of 75 sectors/second, that is, the recording data, is supplied to an encoder 15. In a data string supplied from the memory 14 to the encoder 15, a data unit continuously recorded in each recording is a data cluster composed of a number of, for example 32 sectors, and a few cluster-linking sectors arrayed before and after the cluster. The cluster-linking sector has a length longer than the interleaving length at the encoder 15, so that, even when the data are interleaved, data of neighboring clusters remain unaffected. As for details of the recording on the cluster-by-cluster basis, an explanation will be given later by referring to FIG. 3.

The encoder 15 processes the recording data supplied in a burst-like manner from the memory 14 with an error correcting coding operation, such as by parity addition or interleaving, or by 8-to-14 modulation (EPM). The recording data, thus encoded by the encoder 15, is supplied to the magnetic head driving circuit 16.

To the head driving circuit 16 is connected the magnetic head 4, which is thereby driven to apply a magnetic field modulated in accordance with the recording data to the disc 2.

On the other hand, the system controller 7 performs writing/readout control for the memory 14 and, based on such memory control, performs a disc recording position control so that the above-mentioned recording data read out in a burst fashion from memory 14 will be recorded continuously on the recording track of the disc 2. For the recording position control, the recording position on the disc 1 of the record data read out in a burst fashion from memory 14 is supervised by the system controller 7, and control signals designating the recording position on the recording track of the disc 2 are supplied to the above-mentioned servo controlling circuit 6.

The reproducing system in the disc recording/reproducing apparatus will now be explained.

The reproducing system reproduces the recording data continuously recorded by the above-described recording system on the recording track of the magneto-optical disc 2, and is provided with the decoder 21 supplied with a playback output. This playback output, which is generated by the optical head 3 tracing the recording track on the disc 3 with a laser light, is converted into binary format signals by the RF circuit 5 before being supplied to the decoder 21.

The decoder 21 is a counterpart of the above-described encoder 15 of the recording system, and is adapted for processing the playback output, converted into the binary format signals by the RF circuit 5, with the above-mentioned decoding, such as error correction, or EFM decoding, and for reproducing the above-mentioned mentioned B level stereo mode ADPCM audio data at a transfer rate of 75 sectors/second, which is faster than the normal transfer rate in the above-mentioned B level stereo mode. The reproduced data, generated by the decoder 21, are supplied to a memory 22.

The memory 22 has its data writing and read-out controlled by system controller 7 so that the playback data supplied from decoder 21 at a transfer rate of 75 sectors/second are written at the transfer rate of 75 sectors/second. Also the playback data written at the transfer rate of 75 sectors/second in the memory 22 are continuously read out at the ordinary B-level stereo mode transfer rate of 18.75 sectors/second.

The system controller 7 also performs a writing/readout memory control of writing the reproduced data in the memory 22 at the transfer rate of 75 sectors/second and continuously reading out the playback data from the memory 22 at the transfer rate of 18.75 sectors/second.

The system controller 7 performs, besides the above-mentioned writing and read-out control for the memory 22, a playback position control in such a manner that the playback data written by such memory control in the memory 22 in a burst-like manner are reproduced from the recording track of the disc 2 continuously. The playback position control is performed by supervising a playback position on the disc 1 of the above-mentioned playback data written in a burst-like manner in memory 22 by system controller 7 based on the cluster addresses and the sector addresses, and by supplying a control signal designating the playback position on the recording track of the disc 2 to the servo controlling circuit 6.

The B-level stereo mode ADPCM audio data, produced as playback data read out continuously from memory 22 at a transfer rate of 18.75 sectors/second, are supplied to an ADPCM decoder 23.

The ADPCM decoder 23 is a counterpart of the above-mentioned ADPCM encoder 13 of the recording system. The ADPCM decoder 23 has its operating mode designated by system controller 7. With the present apparatus, the B-level stereo mode ADPCM audio data are expanded by a factor of 4 for reproducing the CD-DA mode digital audio data. The reproduced digital data are transmitted by the ADPCM decoder 23 to a D/A converter 24.

The D/A converter 24 converts the digital audio data supplied from the ADPCM decoder 23 into an analog audio signal $A_{OUT}$ which is supplied via a low-pass filter 25 at an output terminal 26.

The reproducing system of the apparatus is provided with a digital outputting function so that the digital audio data at the output of the ADPCM decoder 23 is outputted at a digital output terminal 28 via a digital output encoder 27 as a digital audio signal $D_{OUT}$.

The magneto-optical disc 2 employed in the above-described disc recording/reproducing apparatus preferably has a recording space of longer than 60 minutes and up to 74 minutes for stereo audio signals. With the data compression rate of ¼ as in the B level mode, a recording capacity of about 130 H bytes is necessary. For a portable or pocketable size of apparatus, it is preferred to use a disc having an outside diameter of 8 cm or less. In addition, a track pitch of 1.6 μm and a 11near velocity of 1.2 to 1.4 m/second, similar to those of a compact disc, are preferred. For satisfying these conditions, the disc outside diameter may be 4 mm, the outside diameter of a disc recording region may be 61 mm, the inside diameter of the data recording region may be 31 mm, the inside diameter of a lead-in region may be 28 mm, and a center hole diameter may be 11 mm. By having this disc accommodated in a disc caddy (cartridge) of 68×72 mm in size and presented to the market in this state, it becomes possible to record and reproduce the disc by a pocket-size recording/reproducing apparatus. The inside and outside diameters of the disc recording region for enabling recording and/or reproduction for 72 to 76 minutes with the above-mentioned ¼ data compression mode may be suitably selected within the range of the outside diameter of 60 to 62 mm for the inside diameter of 31 mm and within the range of the outside diameter of 71 to 73 mm for the inside diameter of 50 mm.

Figure 3:
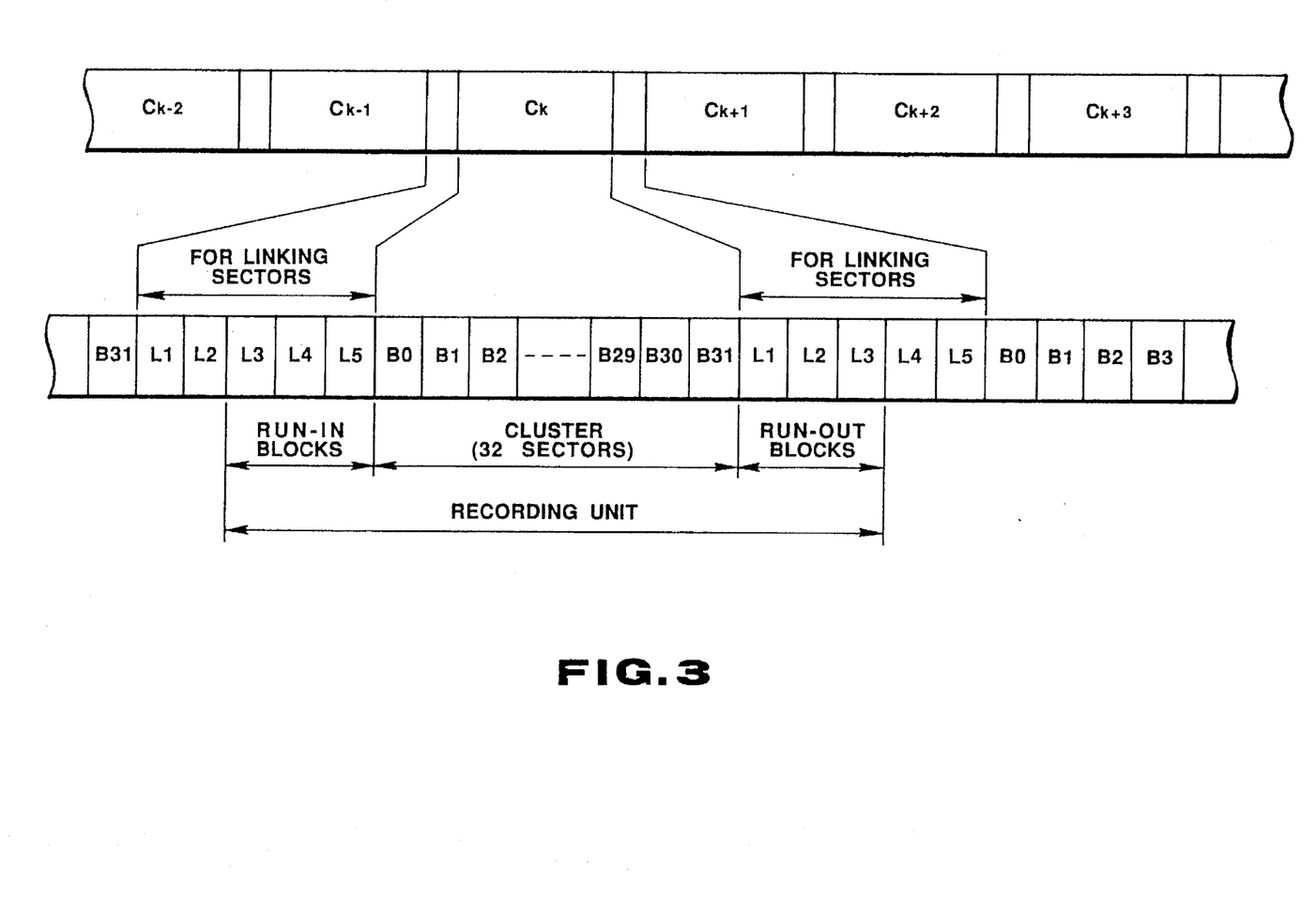
FIG. 3 shows a format of a cluster as a recording unit.

The recording/reproducing operation of the above-described recording/reproducing apparatus will be explained in more detail with reference to FIG. 3.

The recording data, that is data read out from memory 14, is arranged into a cluster at an interval of a predetermined number of, for example, 32, sectors or blocks, and several cluster-linking sectors are arrayed between adjoining clusters. In more detail, each cluster C is composed of 32 sectors or blocks B0 to B31, and five linking sectors L1 to L5 are arranged between these clusters C for linking the adjoining clusters, as shown in FIG. 3. For recording a cluster, such as a K'th cluster $C_k$, the 32 sectors B0 to B31 of the cluster $C_k$, and the linking sectors arrayed before and after the cluster $C_k$, namely the three sectors (referred to as "run-in blocks") L3 to L5 towards the cluster $C_{k-1}$ an the three blocks L1 to L3 towards the cluster $C_{k+1}$ sectors (referred to as "run-out blocks"), making a total of 38 sectors, are recorded as one unit. The 38-sectors of record data are transmitted from memory 14 to the encoder 15 where data are interleaved and rearranged over a distance of up to 108 frames corresponding to about 1.1 (i.e. 108/98) sector. However, even after interleaving, the data within the cluster $C_k$ are safely contained within a range of from the run-in blocks L3 to L5 to the run-out blocks L1 to L3 without affecting the remaining clusters $C_{k+1}$ or $C_{k-1}$. Meanwhile, dummy data, such as zeros (0), are arrayed in the linking sectors L1 to L5 to avoid adverse effects which interleaving might have on the data per se. When recording the next cluster $C_{k+1}$, the three sectors L3 to L5 of the five linking sectors L1 to L5 between the current cluster $C_k$ and the next cluster $C_{k+1}$ are used as run-in blocks. Although the sector L3 is recorded in this manner superfluously, it causes no inconvenience. The cluster may also be composed of 37 sectors inclusive of the linking sectors.

The above-mentioned cluster-by-cluster recording is carried out on the basis of cluster addresses and sector addresses preformatted at the leading end of each sector for discriminating the clusters from one another and the sectors in each cluster from one another, respectively, by modulating the guide groove for deviating the groove along the track width. It is noted that these addresses are obtained during recording by demodulating the guide groove by reproducing the deviation of the groove.

Figure 4:
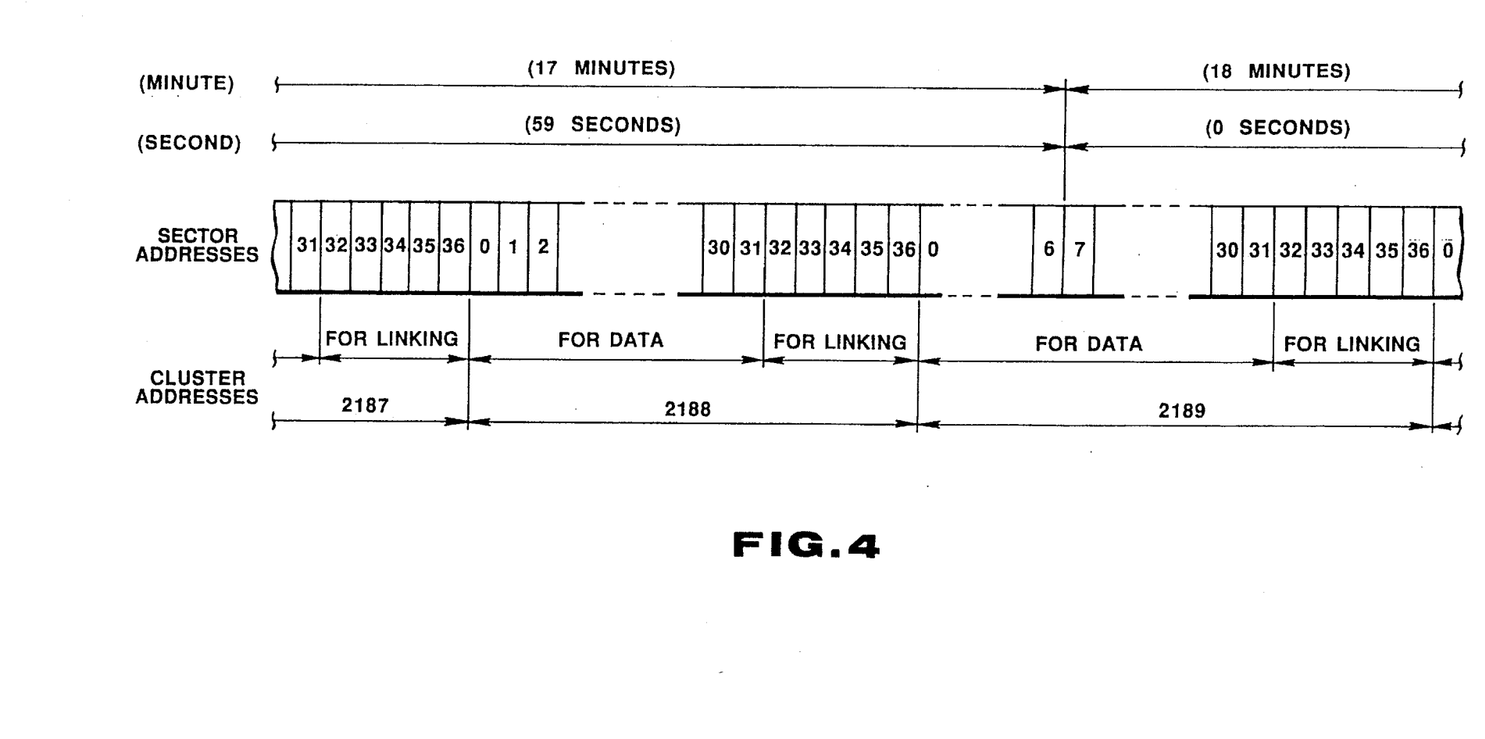
FIG. 4 shows the relation between the cluster address and the sector address.
Figure 5:
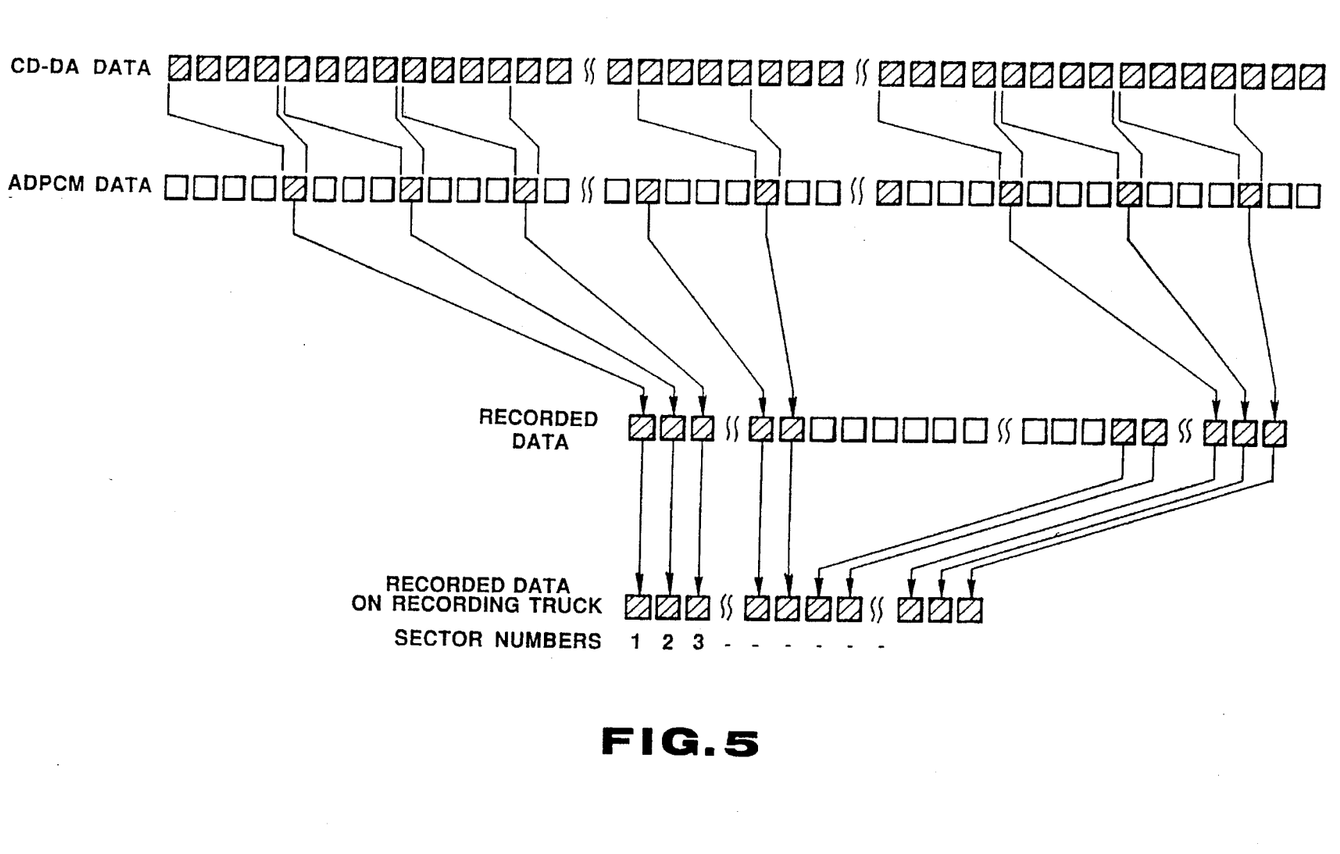
FIG. 5 shows a data format employed in the disc recording and/or reproducing apparatus shown in FIG. 2.

Referring to FIG. 4, each cluster is made up of 32 data-recording sectors and five linking sectors, totaling 37 sectors. The cluster addresses (0000, ..., 2188, 2189, ...) are allocated for discriminating each cluster and the sector addresses (0 to 36) are allocated for discriminating each sector in one cluster. These cluster addresses and sector addresses which are prerecorded on the disc by modulating the guide groove are reproduced during recording so that the recording position on the recording track are supervised on the basis of these reproduced cluster addresses and sector addresses.

By such recording on the cluster-by-cluster basis, there is no necessity to take account of interference with adjoining clusters, so that data processing may be simplified significantly. On the other hand, if the record data should be unable to be recorded normally due to real functions, such as defocusing, detracking etc., re-recording may be performed on the cluster-by-cluster basis. If the recorded data cannot be reproduced effectively, re-recording may similarly be effected on the cluster-by-cluster basis.

Meanwhile, the digital data produced by the A/D converter 12 in the recording system of the disc recording and/or reproducing apparatus shown in FIG. 2 are data similar to those of the above-mentioned CD-DA format, that is audio PCM data having a sampling frequency of 44.1 kHz, the number of bits for quantization of 16 and the data transfer rate of 75 sectors/second. These data are transmitted to ADPCM encoder 13 and, if the data are bit-compressed in accordance with the above-mentioned B-level stereo mode, the sampling rate is changed to the sampling frequency of 37.8 kHz and the number of bits for quantization is compressed to 4. Thus the output data are ADPCM audio data having the data transfer rate reduced by ¼, or equal to 18.75 sectors/second. The B-level stereo mode ADPCM audio data, continuously outputted at the transfer rate of 18.75 sectors/second from the ADPCM encoder 13, are supplied to memory 14.

Figure 6:
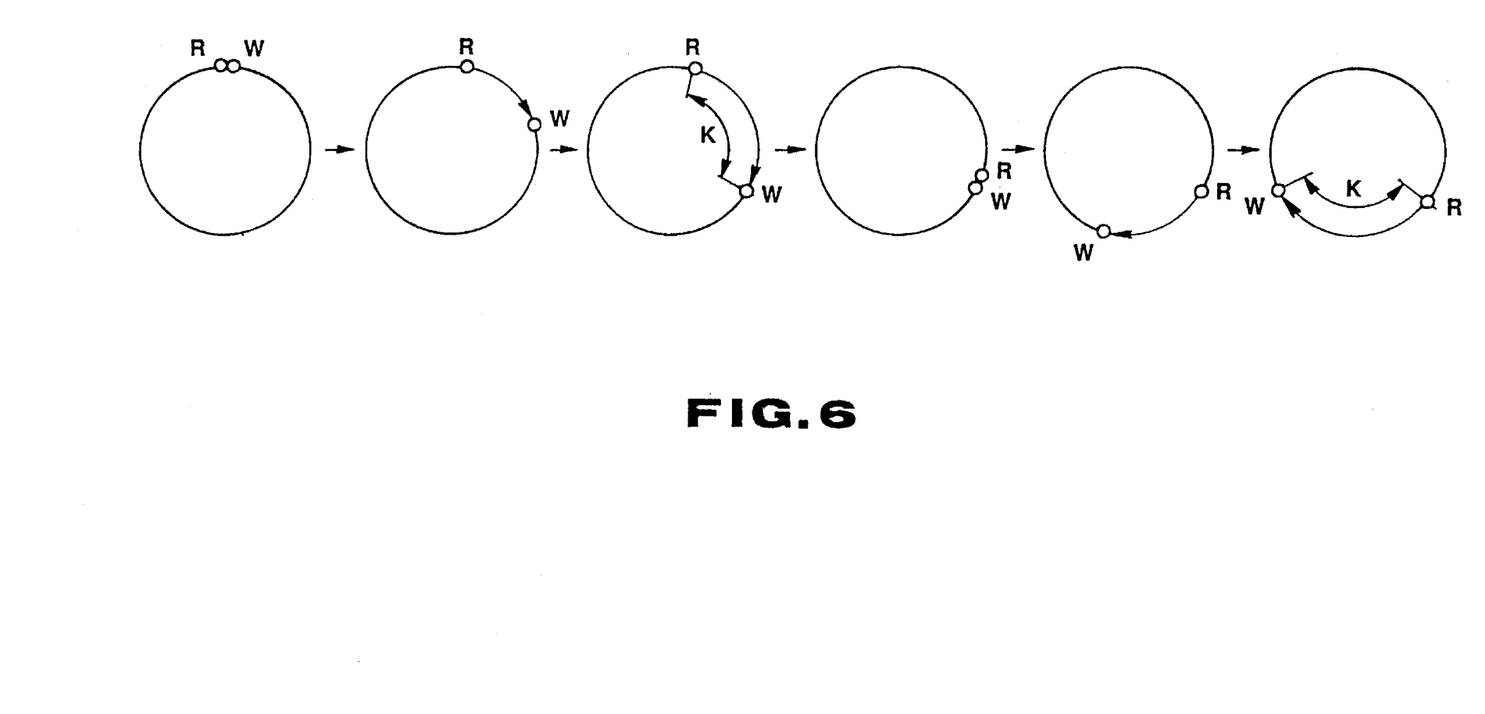
FIG. 6 shows the state of a memory-controlled memory in the recording system of the disc recording and/or reproducing apparatus shown in FIG. 2.

Referring to FIG. 6, the system controller 7 controls the memory 14 in such a manner that a write pointer W of the memory 14 is continuously incremented at a transfer rate of 18.75 sectors/second to continuously while the ADPCM audio data in the memory 14 at a transfer rate of 18.75 sectors/second and, when the data volume of the ADPCM audio data stored in the memory 14 exceeds a predetermined volume K, a read pointer R of the memory 14 is incremented at the transfer rate of 75 sectors/second to read out the predetermined amount K of the ADPCM data from the memory 14 as recording data at the above mentioned transfer rate of 75 sectors/second.

That is, in the recording system of the disc recording/reproducing apparatus shown in FIG. 2, the ADPCM audio data continuously outputted at the transfer rate of e.g. 18.75 sectors per second from the ADPCM encoder 13 are written in the memory 14 at the above mentioned transfer rate of 18.75 sectors/second under memory control by system controller 7. When the data volume of the ADPCM data stored in the memory 14 exceeds the predetermined data volume K, the ADPCM audio data is read out from memory 14 by the data volume K at the transfer rate of 75 sectors/second as recording data, so that input data can be continuously written in the memory 14 while a data write region in excess of a predetermined volume is perpetually maintained within the memory 14. By recording the recording position on the recording track of the magneto-optical disc 2 based on the cluster and sector addresses under control by the system controller 7, the recording data read out in a burst fashion from the memory 14 can be recorded consecutively on the recording track on the magneto-optical disc 2. Since a data write region in excess of a predetermined volume is maintained in the memory 14, data can be continuously written in the data writing region in excess of the predetermined volume even if the system controller 7 detects that a track jump etc. has occurred due to disturbances or the like to interrupt a recording operation on the magneto-optical disc 2, and the reset operation may be carried out in the interim, so that input data can be recorded continuously on the recording track of the magneto-optical disc 2. It is also possible to display the current position by actual recording time by multiplying the cluster address by 32/75 or a reciprocal of the data compression factor.

Figure 7:
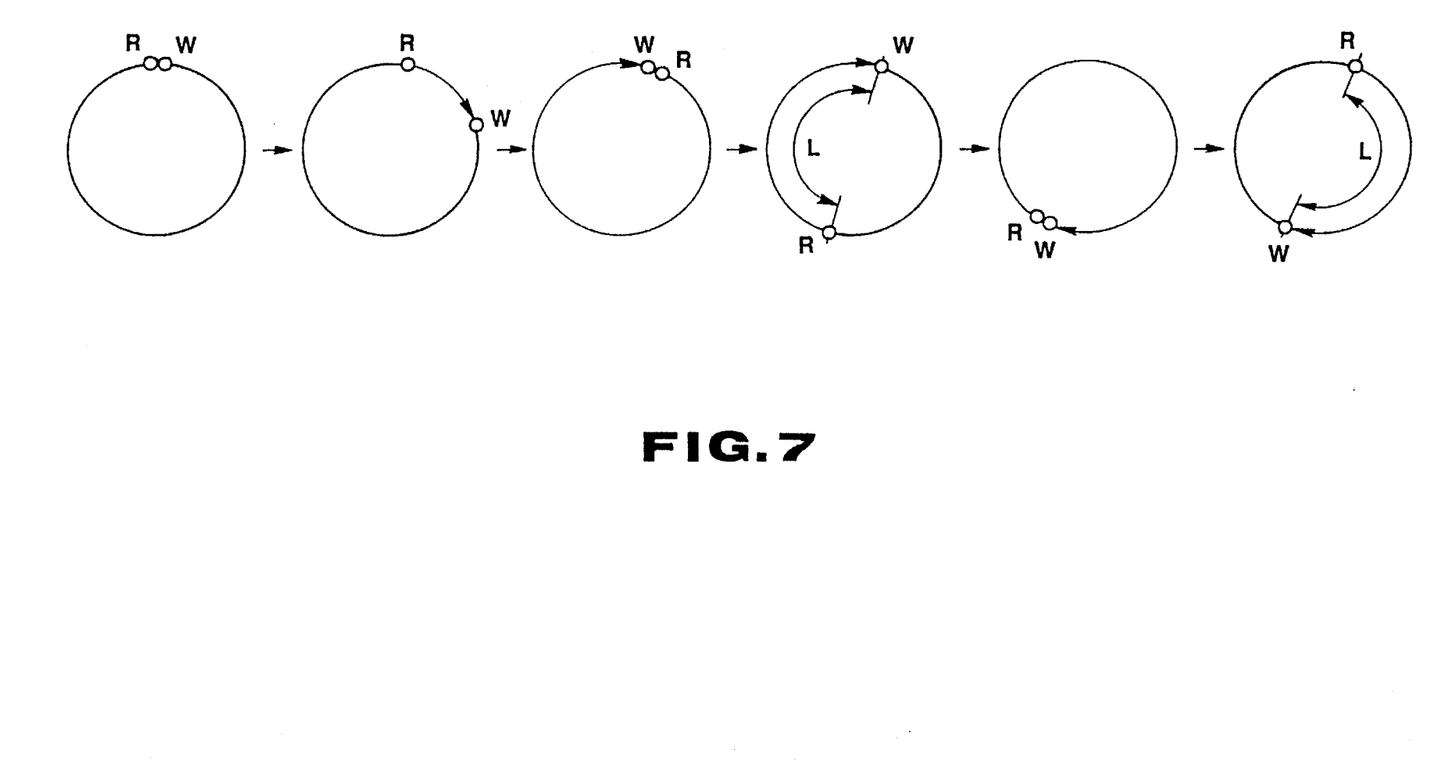
FIG. 7 shows the state of a memory-controlled memory in the reproducing system of the disc recording and/or reproducing apparatus shown in FIG. 2.

In the reproducing system of the disc recording/reproducing apparatus shown in FIG. 2, the system controller 7 controls the memory 22 in such a manner that, as shown in FIG. 7, the write pointer W of the memory 22 is incremented at a transfer rate of 75 sectors/second to write the reproduced data in the memory 22 at the transfer rate of 75 sectors/second, the read pointer R of the memory 22 is continuously incremented at a transfer rate of 18.75 sectors/second to continuously read out the playback data from memory 22 at the transfer rate of 18.75 sectors/second, writing is discontinued when the write pointer W catches up with the read pointer R and, when the data volume of the playback data stored in the memory 22 is lower than the predetermined volume L, writing is started again.

Thus, with the above described reproducing system of the disc recording/reproducing apparatus, the system controller 7 controls the memory 22 in such a manner that the B-level stereo mode ADPCM audio data reproduced from the recording track of the magneto-optical disc 2 in a burst-like manner is written in memory 22 at a transfer rate of 75 sectors/second, and read out continuously from the memory 22 as playback data at the transfer rate of 75 sectors/second, so that the playback data may be continuously read out from the memory 22 while the data readout region in excess of the predetermined volume L is perpetually maintained within memory 22. Also the playback data intermittently written in the memory 22 may be continuously reproduced from the recording track on the magneto-optical disc 2 by controlling the reproducing posit, ion on the recording track of the magneto-optical disc 2 by the system controller 7. In addition, the data read-out region in excess of the predetermined volume L is perpetually maintained in the memory 22, as described previously, so that, even when the system controller 7 should detect the occurrence of a track jump etc. due to, for example, disturbances, and the operation of reproducing the magneto-optical disc 2 is discontinued, the playback data may be read out from the data readout region having a space in excess of the predetermined data volume to continue the outputting of the analog audio signals, while the resetting operation may be executed in the interim. The play time may also be displayed by reading the last cluster of a music and multiplying the cluster address by 32/75 or the reciprocal of the data compression ratio.

It is to be noted that the present invention is not limited to the above described embodiment, but may comprise various modifications. For example, although the above disc recording/reproducing apparatus has been explained in connection with recording and/or reproduction of the B level stereo mode ADPCM audio data, recording and/or reproduction may be performed similarly of the ADPCM audio data of other modes of other CD-I systems. The method of data compression is also not limited to ADPCM. The number of sectors constituting a cluster is not limited to 32, but a cluster may be composed of any other number of sectors, such as 64 sectors.

In the disc recording apparatus of the present invention, when recording data on a disc-shaped recording medium, on which the cluster addresses and the sector addresses are recorded previously, the digital data to be recorded are momentarily stored in a memory, the digital data from the memory are arranged into clusters at an interval of a predetermined number of sectors, cluster-linking sectors having a length longer than the interleaving length are arrayed at linking portions between the neighboring clusters, the data are interleaved and recorded at predetermined recording positions of the disc-shaped recording medium based on the cluster addresses and the sector addresses reproduced from the recording medium. In this manner, interleaving of data in a given cluster is confined within the ranges of the cluster-linking sectors, without affecting the neighboring clusters, so that cluster by cluster recording may be facilitated, while the recording starting sector position may be obtained easily from the cluster addresses and the sector addresses.

Also, in the disc reproducing apparatus of the present invention, control is so made that playback data are obtained by reproducing a disc-shaped recording medium, in which cluster addresses and sector addresses are previously recorded, digital data are arranged into clusters at an interval of a predetermined number of clusters, cluster-linking sectors longer than the interleaving length are arrayed at linking portions between the neighboring clusters, and in which the data are interleaved before recording, on the basis of the cluster addresses and the sector addresses, the reproduced data are momentarily stored in the memory and the reproduced data are written when the data volume stored in the memory is lesser than a predetermined volume so that a readout space in excess of the predetermined data volume is maintained in the memory, so that dropout of playback data due to the cluster-linking sectors may be buffered and hence continuous playback data may be obtained from the memory. On the other hand, the play time may be provided easily from the cluster addresses.

What is claimed is:

1. A disc-shaped recording medium of the type in which data recorded thereon are divided into sectors which each contain a plurality of bits and wherein the improvement comprises:

that the recorded data is organized as clusters of a predetermined number of the sectors with cluster-linking sectors at connecting portions of adjacent clusters, and further with cluster addresses for specifying the clusters and sector addresses for specifying the sectors in the cluster being prerecorded on the recording medium.

2. A disc-shaped recording medium as claimed in claim 1 wherein the cluster addresses and the sector addresses are prerecorded by offsetting a recording track on the recording medium radially thereof.

3. An optical disc recording apparatus for use with an optical disc on which cluster addresses and sector addresses for specifying sectors in clusters are prerecorded on said disc, comprising:

memory means for transiently storing input digital data which are compressed continuous signals, signal processing means for reading out and arraying the input digital data from the memory means in clusters of a predetermined number of sectors, each sector including a plurality of bits, appending to connecting portions of the clusters cluster-linking sectors which are longer than an interleaving length for the input digital data and for subsequently interleaving the input digital data in the clusters, address reproducing means for reproducing the cluster addresses and the sector addresses from the disc, controlling means for controlling recording positions on the disc based on the cluster addresses and the sector addresses reproduced from the address reproducing means, and recording means for recording the digital data from the signal processing means at address positions on the disc designated by the controlling means.

4. An optical disc recording apparatus as claimed in claim 3 comprising abnormal condition detection means for detecting detracking and/or defocusing for determining an abnormal condition in a recording operation, resetting controlling means for inhibiting the recording operation on detection of the abnormal condition by the abnormal condition detection means and for resetting the memory means from the abnormal condition to a normal condition, and memory controlling means for effecting readout control of the memory means by reading a predetermined amount of the data on a cluster-by-cluster basis from the memory means when a volume of the input digital data stored in the memory means exceeds a first preset volume for perpetually maintaining a writing space more than a second preset volume in the memory means, wherein recording position controlling is effected in such a manner that the data intermittently read out on the cluster-by-cluster basis from the memory means under control by the memory controlling means are recorded continuously on a recording track of the disc on the basis of the cluster addresses and the sector addresses.

5. An optical disc recording apparatus as claimed in claim 4 wherein the second preset volume is in excess of a volume of the data entered into the memory means during the time of restoration from an unrecordable state to a recordable state.

6. An optical disc recording apparatus as claimed in claim 5 wherein the first preset volume corresponds to a data volume of the cluster.

7. An optical disc recording apparatus as claimed in claim 3 wherein the cluster-linking sector is constituted by dummy data not affecting the digital data in the cluster.

8. An optical disc recording apparatus as claimed in claim 3 wherein the sector corresponds to a block of 98 EFM frames of a compact disc.

9. An optical disc recording apparatus as claimed in claim 3 further comprising processing means for calculating absolute time based on the cluster addresses recorded on the disc.

10. A disc reproducing apparatus for reproducing compressed digital data recorded on an optical disc wherein the recorded digital data are divided into sectors, each sector containing a plurality of bits, the sectors are arrayed into clusters of a predetermined number of the sectors, and in which cluster-linking sectors, each longer than an interleaving length, are added at connecting portions of adjacent clusters, and on which cluster addresses for specifying the clusters and sector addresses for specifying the sectors are prerecorded, the apparatus comprising:

reproducing means for reproducing the recorded compressed digital data, the cluster addresses and the sector addresses from the disc, memory means connected to the reproducing means for sequentially storing the compressed digital data reproduced from the disc, expanding means for reading out and expanding the compressed digital data from the memory means and outputting the expanded data, memory controlling means for monitoring the data volume stored in the memory means for controlling the writing and readout of the memory means so that data writing in the memory means is terminated before overflow of the memory means and data writing is re-started when a data volume stored in the memory means is less than a predetermined volume, and controlling means for controlling the playback position on the disc at the time of restarting data writing in the memory means, on the basis of the cluster addresses and the sector addresses reproduced by the reproducing means, so that data contiguous to data stored in the storage means are reproduced.

11. An optical disc recording apparatus as claimed in claim 10 wherein the sector corresponds to a block of 98 EFM frames of a compact disc.

12. An optical disc recording apparatus as claimed in claim 10 further comprising processing means for calculating absolute time based on the cluster addresses recorded on the disc.

13. A disc-shaped recording medium of the type in which data recorded thereon are divided into sectors, each sector including a plurality of bits, and the data within the sectors are subjected to interleaving, wherein the improvement comprises:

that the recorded data is organized as clusters of a predetermined number of the sectors with cluster-linking sectors at connecting portions of adjacent clusters, each cluster linking sector having a length which is greater than an interleaving length of the data, and further with cluster addresses for specifying the clusters and sector addresses for specifying the sectors in the cluster being prerecorded on the recording medium.

\* \* \* \* \*